United States Patent
Tseng

(10) Patent No.: US 9,163,932 B2
(45) Date of Patent: Oct. 20, 2015

(54) MEASURING DEVICE AND PROCESSING SYSTEM USING SAME

(71) Applicant: ShenZhen Goldsun Network Intelligence Technology Co., Ltd., ShenZhen (CN)

(72) Inventor: Yung-Chang Tseng, New Taipei (TW)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 257 days.

(21) Appl. No.: 13/962,960

(22) Filed: Aug. 9, 2013

(65) Prior Publication Data

US 2014/0218512 A1 Aug. 7, 2014

(30) Foreign Application Priority Data

Feb. 4, 2013 (TW) .............................. 102104122 U

(51) Int. Cl.
*G01B 11/06* (2006.01)

(52) U.S. Cl.
CPC .................................. *G01B 11/0608* (2013.01)

(58) Field of Classification Search
None
See application file for complete search history.

(56) References Cited

U.S. PATENT DOCUMENTS

| 5,771,100 A * | 6/1998 | Kawai et al. ................... 356/626 |
| 2003/0185430 A1 * | 10/2003 | Theobald et al. .............. 382/141 |
| 2009/0112487 A1 * | 4/2009 | Zhang et al. .................... 702/34 |

* cited by examiner

*Primary Examiner* — Kate Luo
(74) *Attorney, Agent, or Firm* — Novak Druce Connolly Bove + Quigg LLP

(57) ABSTRACT

A measuring device is configured to measure a height of a mold. The measuring device includes a laser generator, a raster, a camera module, and a controller. The raster is positioned between the laser generator and the mold. A laser beam emitted by the laser generator is refracted by the raster to divide the laser into two laser beams. The two laser beams cooperatively define a predetermined angle θ. The camera module is configured to capture an image of the two laser beams irradiated onto the top surface. The controller is electrically connected to the camera module, and configured to receive the image and to calculate an actual distance D between the two laser beams, according to the image. The controller is capable of calculating a height H of the mold, according to D and the predetermined angle θ.

8 Claims, 1 Drawing Sheet

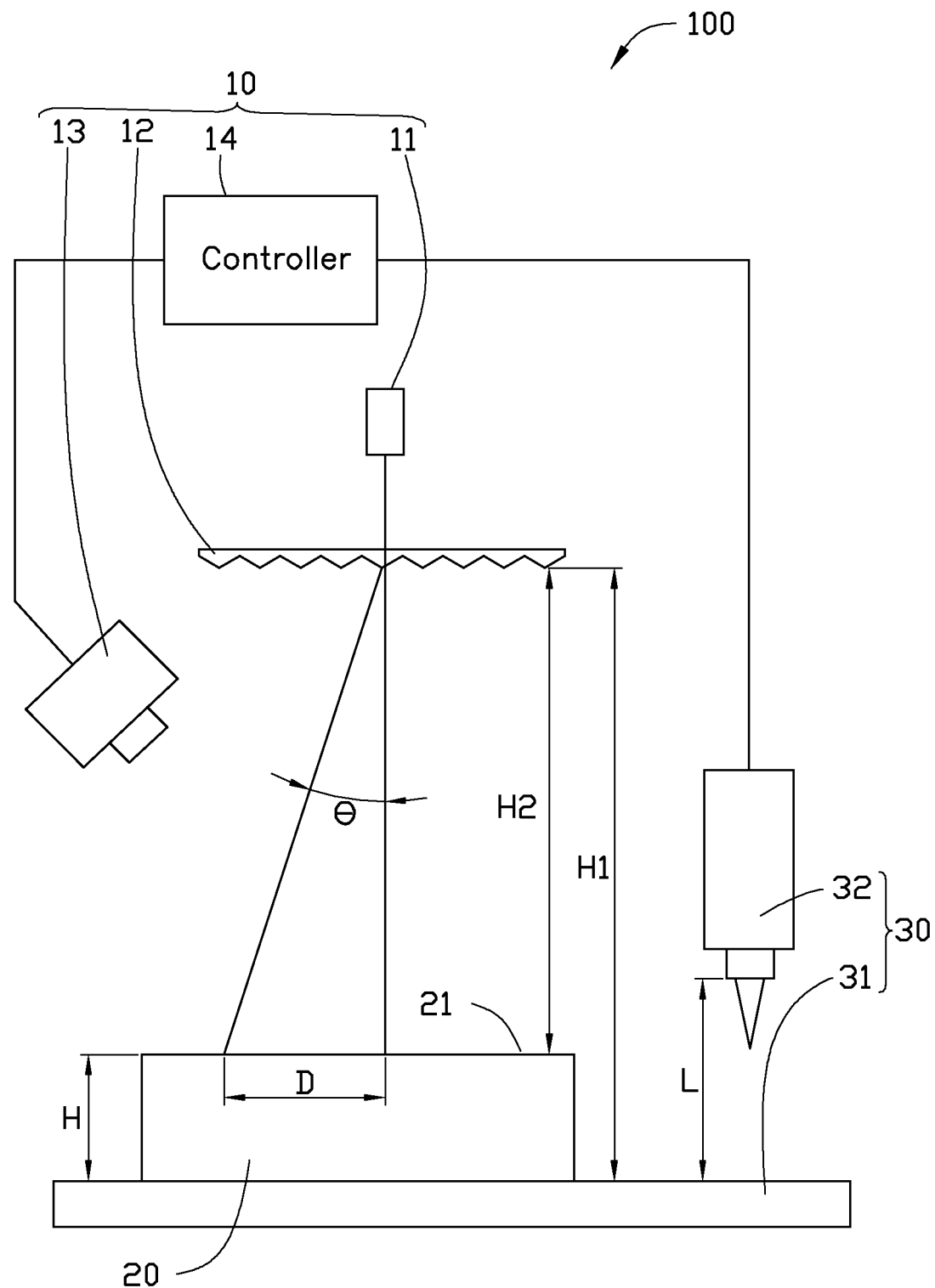

MEASURING DEVICE AND PROCESSING SYSTEM USING SAME

BACKGROUND

1. Technical Field

The present disclosure relates to a measuring device and a processing system using the same.

2. Description of Related Art

When a laser machining device machines a mold configured to manufacture light guiding plates, an operators need to set a height of the mold in the machining device to make the laser machining device to move above the mold at a fixed height. The fixed height is a height of a focus point of a laser beam emitted by the laser machining device. As such, the laser machining device is capable of machining the mold at maximum efficiency.

However, different types of molds have different heights, if the operator makes even a slight error in setting the height in the machining device, the machining device cannot machine the mold at maximum efficiency.

Therefore, it is desirable to provide a measuring device and a processing system using the same that can overcome the above-mentioned limitations.

BRIEF DESCRIPTION OF THE DRAWINGS

Many aspects of the present disclosure can be better understood with reference to the following drawing. The components in the drawing are not necessarily drawn to scale, the emphasis instead being placed upon clearly illustrating the principles of the present disclosure.

The FIGURE is a schematic view of a processing system, according to an exemplary embodiment.

DETAILED DESCRIPTION

The FIGURE shows a processing system 100 configured to machine a mold 20. The mold 20 is configured to manufacture light guiding plates (not shown).

The processing system 100 includes a measuring device 10 and a laser machining device 30.

The laser machining device 30 includes a base 31 and a laser machining element 32. The base 31 is configured to support the mold 20. The laser machining element 32 is configured to emit a laser beam to machine the mold 20.

The measuring device 10 is configured to measure a height of the mold 20, and includes a laser generator 11, a raster 12, a camera module 13, and a controller 14.

The laser generator 11 is positioned above the mold 20. A laser beam emitted by the laser generator 11 is substantially perpendicular to a top surface 21 of the mold 20.

The raster 12 is positioned between the laser generator 11 and the mold 20. The laser beam emitted by the laser generator 11 is refracted by the raster 12 to divide the beam into two laser beams. The two laser beams cooperatively define a predetermined angle θ, and are irradiated onto the top surface 21 of the mold 20. The predetermined angle θ is in a range from 30 degrees to 60 degrees. In the embodiment, the predetermined angle θ is about 30 degrees.

The camera module 13 is positioned above the mold 20, and is located between the raster 12 and the mold 20. The camera module 13 is configured to capture an image of the two laser beams irradiated onto the top surface 21 of the mold 20, and transmits the image to the controller 14.

The controller 14 is electrically connected to the camera module 13. The controller 14 is configured to receive the image transmitted by the camera module 13 and to calculate an actual distance D between the two laser beams irradiated onto the top surface 21 of the mold 20, according to the image. Thus, the controller 14 is capable of calculating a height H of the mold 20 in a direction substantially perpendicular to the top surface 21, according to the formulas: $H_2=D/\tan\theta$ and $H=H_1-H_2$, wherein, $H_1$ is a distance between the raster 12 and the base 31 of the laser machining device 30 in a direction substantially perpendicular to the top surface 21; H2 is a distance between the raster 12 and the mold 20 in a direction substantially perpendicular to the top surface 21.

The controller 14 is also electrically connected to the laser machining element 32 of the laser machining device 30. The controller 14 can control the laser machining element 32 to move up and down along a direction substantially perpendicular to the top surface 21. The controller 14 stores a height F of a focus point of a laser beam emitted by the laser machining element 32, with respect to the base 31. The controller 14 controls the laser machining element 32 moving to a location where a distance L between the laser machining element 32 and the base 31 is substantially equal to H plus F. As such, the laser machining element 32 is capable of processing the mold 20 at maximum efficiency.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A measuring device configured to measure a height of a mold, the mold supported by a base, the measuring device comprising:

a laser generator positioned above the mold, a laser beam emitted by the laser generator substantially perpendicular to a top surface of the mold;

a raster positioned between the laser generator and the mold, a laser beam emitted by the laser generator being refracted by the raster to divide the laser beam into two laser beams, the two laser beams cooperatively defining a predetermined angle θ;

a camera module positioned above the mold and located between the raster and the mold, the camera module configured to capture an image of the two laser beams irradiated onto the top surface of the mold; and a controller electrically connected to the camera module, the controller configured to receive the image transmitted by the camera module and to calculate an actual distance D between the two laser beams irradiated onto the top surface of the mold, according to the image, the controller being capable of calculating a height H of the mold, according to D and the predetermined angle θ.

2. The measuring device of claim 1, wherein the predetermined angle θ is in a range from 30 degrees to 60 degrees.

3. The measuring device of claim 2, wherein the predetermined angle θ is about 30 degrees.

4. The measuring device of claim 1, wherein the controller is capable of calculating the height H of the mold according to the formulas: $H_2=D/\tan\theta$ and $H=H_1-H_2$, wherein, $H_1$ is a distance between the raster and the base; H2 is a distance between the raster and the mold.

5. A processing system configured to machine a mold, the processing system comprising:

a measuring device configured to measure a height H of the mold, the measuring device comprising a controller; and a laser machining device for machining the mold, the laser machining device comprising a base and a laser machining element, the base configured to support the mold, the laser machining element configured to emit a laser beam to machine the mold, the controller electrically connected to the laser machining element, the controller controlling the laser machining element to move up and down along a direction substantially perpendicular to a top surface of the mold, the controller storing a height F of a focus point of a laser beam emitted by the laser machining element, with respect to the base, wherein the controller controls the laser machining element moving to a location where a distance L between the laser machining element and the base is substantially equal to H plus F;

wherein the measuring device comprises a laser generator, a raster and a camera module, the laser generator is positioned above the mold, the laser beam emitted by the laser generator is substanially perpendicular to the top surface of the mold, the raster is positioned between the laser generator and the mold, the laser beam emitted by the laser generator is refracted by the raster to divide the laser beam into two laser beams, the two laser beams cooperatively define a predetermined angle $\theta$, the camera module is positioned above the mold and located between the raster and the mold, the camera module is configured to capture an image of the two laser beams irradiated onto the top surface of the mold, the controller is electrically connected to the camera module, the controller is also configured to receive the image transmitted by the camera module and to calculate an actual distance D between the two laser beams irradiated onto the top surface of the mold, according to the image, the controller is capable of calculating a height H of the mold, according to D and the predetermined angle $\theta$.

6. The processing system of claim 5, wherein the predetermined angle $\theta$ is in a range from 30 degrees to 60 degrees.

7. The processing system of claim 6, wherein the predetermined angle $\theta$ is about 30 degrees.

8. The processing system of claim 5, wherein the controller is capable of calculating the height H of the mold according to the formulas: $H_2 = D/\tan \theta$ and $H = H_1 - H_2$, wherein, $H_1$ is a distance between the raster and the base; H2 is a distance between the raster and the mold.

* * * * *